Patented Dec. 29, 1931

1,838,826

UNITED STATES PATENT OFFICE

FRITZ GÜNTHER, HEINRICH HOPFF, AND CURT SCHUSTER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRESERVATION AND TREATMENT OF LATEX

No Drawing. Application filed November 10, 1927, Serial No. 232,463, and in Germany November 11, 1926.

The present invention relates to the preservation and treatment of latex, in particular rubber latex.

We have found that soluble salts of true sulfonic acids having a high wetting power can be used with advantage for the preservation and for improving the treatment or application of rubber latex. By the term "true sulfonic acids having a high wetting power", namely wetting out, emulsifying or dispersing properties, we mean aromatic or hydroaromatic sulfonic acids which contain alkyl-, cycloalkyl-, aralkyl- or aryl groups as substituents, either in the nucleus or in other substituents such as amino or hydroxyl groups (such hydrocarbon groups of the aforesaid type may also link together two or more aromatic or hydroaromatic nuclei) and in addition thereto may contain further substituents, further the true sulfonic acids (in contradistinction to sulfuric acid esters) obtainable by sulfonation of aliphatic tar oils, mineral oils or fractions thereof, such as solar oils, naphthenic acids, fatty acids and the like, and also such sulfonic acids as are adapted for splitting fats such as Twitchell splitter, contact splitter and the like, or true sulfonic acids which can be used as artificial tanning agents. In the true sulphonic acids the sulphur is directly linked to the carbon atom.

By the addition of a small quantity of the said salts, either alone or in conjunction with other substances, especially such as for themselves exert a preserving influence, for example ammonia, the latex can be effectively preserved from spontaneous coagulation.

The presence of the said salts is also advantageous when treating latex, for example impregnating materials with latex, especially porous materials such as textile fabrics, cork, paper and the like, and more particularly in connection with water-proofing. For this purpose, the latex may be mixed with small quantities of the said salts, or the material under treatment may be impregnated with a solution of the salts, prior to the application of the latex. In all such cases, the latex is readily distributed over the surface and penetrates quickly into the pores.

An addition of the aforesaid salt proves also very useful in case the latex is to be vulcanized by a treatment with finely divided sulfur or other sulfurizing agent. The addition of the said salts in the vulcanization of latex is of particular importance when the vulcanization is to be effected by means of sulfur dioxid and sulfuretted hydrogen which react with each other with the formation of sulfur in an extremely fine state of division which is of particular value for the vulcanization. Hitherto it has not been possible to vulcanize latex by this process, since it readily coagulates under the action of sulfur dioxid. According to the present invention however, the addition of the aforesaid salts of sulfonic acids having a high wetting power, prevents any coagulation and thus the latex can be vulcanized by means of sulfur dioxid and sulfuretted hydrogen without any coagulation or other drawbacks occurring.

The term "latex" whenever used in this application is intended to mean not only the juice in its natural condition but also preserved or concentrated or otherwise treated latex.

We have further found that it is often particularly advantageous to employ the aforesaid salts of sulfonic acids having a high wetting power in conjunction with organic liquids such as aliphatic or aromatic alcohols, ketones hydrocarbons. When such mixtures of salts and organic liquids are added to latex, for example, the impregnation of fabrics can be effected in a more rapid and efficient way, since the latex penetrates more rapidly into the pores than ordinary latex, stabilized only by means of ammonia or sulfonic acid salts alone and does not undergo coagulation when filling materials, for example, magnesium oxid, are added thereto.

The proportions in which the aforesaid salts, and, if desired, the organic liquids are added to the latex or employed in the treatment or application of latex, may be varied within wide limits. Usually, however, the addition of a few per cent of the said substances to the latex will be sufficient for all practical requirements. In the case of the addition of the aforesaid organic liquids it is advantageous to employ an amount of about from 5 to 20 per cent of the latter reckoned on the amount of the latex.

The following examples will further illustrate how the said invention may be carried into practical effect, but the invention is not limited to these examples. The parts are by weight.

*Example 1*

10 parts of latex are mixed by stirring or agitation at ordinary temperature with 0.2 part of the finely powdered sodium salt of a butyl-naphthalene-sulfonic acid. Ammonia or small quantities of other substances having an alkaline reaction may also be employed in addition to the said sodium salt. In all cases the stability of the latex so treated is considerably improved. The said sodium salt may also be replaced, for example, by the sodium or ammonium salt of the sulfonic acid obtained in accordance with Example 2 of the U. S. Patent No. 1,191,480.

*Example 2*

A closely woven fabric, such as filter cloth, is sprayed with a latex containing, for example, from 2 to 5 per cent of the sodium salt of a propyl-naphthalene-sulfonic acid. The latex is distributed over the cloth in a very uniform manner and quickly penetrates into the material. The said sodium salt may also be replaced by a salt of N-diamyl-naphthylamine-sulfonic acid, or of sulfonated brown-coal-tar oil, solar oil, or any other salt of the said type which possesses good wetting out properties. The amount of the added substance may be varied within wide limits.

The material to be impregnated may also be treated in the first instance with a solution of the said salts, and the latex subsequently applied to the material, the latter being first dried if necessary.

*Example 3*

50 parts of natural or concentrated or vulcanized latex are mixed with an aqueous solution of 1 to 3 parts of the sodium salt of propyl- or butyl-naphthalene-sulfonic acid. The latex thus treated can be mixed with fillers such as magnesia, calcium oxid and the like, without coagulation taking place.

*Example 4*

100 parts of latex are mixed, while stirring, with 5 parts of the salt of a butyl-naphthalene-sulfonic acid with normal butylamine. The resulting product is practically completely stable for any desired time, especially when small amounts of a free amine such as normal butylamine and the like are added to the solution. Instead of the beforementioned salt of butylamine other salts of amines, for example those of ethyl- or propylamine, may be employed.

*Example 5*

Latex to which 2 per cent of the sodium salt of a propyl-naphthalene-sulfonic acid has been added, is evaporated in vacuo at a temperature only slightly elevated. Without any coagulation, a high per cent latex is obtained which may later be diluted with water without difficulty.

*Example 6*

100 parts of latex stabilized by the addition of 2 parts of the sodium salt of a butyl-naphthalene-sulfonic acid in accordance with Example 1, are mixed, while vigorously stirring with 5 parts of a plasticizing agent such as olein, palm oil, wool oil, rape-seed oil or the like. The plasticizing agent is rapidly and uniformly emulsified in the latex, and in the further treatment a homogeneous final product is obtained.

*Example 7*

100 parts of latex are mixed while stirring with 5 parts of a butyl-naphthalene sodium sulfonate and, after the said salt has been dissolved, with 10 parts of heptyl alcohol. The latex so treated is considerably more stable than when treated in the usual manner, for example, with ammonia. Instead of heptyl alcohol, other alcohols, for example propyl, butyl, amyl, or benzyl alcohol, or cyclohexanol and the like, or ketones such as cyclohexanone, or hydrocarbons, for example, tetrahydro-naphthalene, or hydrocarbon derivatives, for instance nitrobenzene may be employed. The stabilization of the latex may also be effected by first preparing a solution or emulsion of the alcohol or other organic liquid in the aqueous solution of the sulfonic acid salt and then adding this mixture to the latex.

*Example 8*

A closely woven cotton fabric is sprayed with a latex mixture, prepared as described in Example 7. The latex mixture at once penetrates into the fabric and a good impregnation is effected in a short time.

*Example 9*

100 parts of latex are mixed with 2.5 parts of the sodium salt of the sulfonated condensation product of naphthalene and formaldehyde, obtainable, for example, in accordance with the U. S. Patent No. 1,191,480. Sulfur dioxid is then introduced into the liquid while cooling. After the latex has taken up a sufficient amount of sulfur dioxid, sulfuretted hydrogen is passed in and the mixture stirred for some time, whereupon the vulcanized rubber may be recovered from the vulcanized latex, for example by evaporation or in any other suitable manner.

What we claim is:

1. The process of preserving and treating latex, characterized by the employment of a soluble salt of an alkyl naphthalene sulfonic acid.

2. The process of preserving and treating latex, characterized by the employment of a soluble salt of a true sulfonic acid having a high wetting power in conjunction with a liquid alcohol.

3. A composition of matter comprising latex and a soluble salt of an alkylated naphthalene sulfonic acid.

4. A composition of matter comprising latex, a soluble salt of a true sulfonic acid having a high wetting power, and a liquid alcohol.

5. The process of preserving and treating latex, characterized by the employment of a soluble salt of an alkylated aromatic sulfonic acid.

6. The process of preserving and treating latex, characterized by the employment of a soluble salt of a butyl naphthalene sulfonic acid.

7. The process of preserving and treating latex, characterized by the employment of a soluble salt of an alkylated aromatic sulfonic acid in conjunction with a liquid alcohol.

8. The process of preserving and treating latex, characterized by the employment of a soluble salt of a butyl naphthalene sulfonic acid in conjunction with a liquid alcohol.

9. A composition of matter comprising latex and a soluble salt of an alkylated aromatic sulfonic acid.

10. A composition of matter comprising latex and a soluble salt of a butyl naphthalene sulfonic acid.

11. A composition of matter comprising latex and a soluble salt of an alkylated aromatic sulfonic acid in conjunction with a liquid alcohol.

12. A composition of matter comprising latex and a soluble salt of a butyl naphthalene sulfonic acid in conjunction with a liquid alcohol.

13. The process of preserving and treating latex, characterized by the employment of a sodium salt of an alkylated aromatic sulfonic acid.

14. The process of preserving and treating latex, characterized by the employment of a sodium salt of an alkyl naphthalene sulfonic acid.

15. The process of preserving and treating latex, characterized by the employment of a sodium salt of a butyl naphthalene sulfonic acid.

16. The process of preserving and treating latex, characterized by the employment of a sodium salt of an alkylated aromatic sulfonic acid in conjunction with a liquid alcohol.

17. A composition of matter comprising latex and a sodium salt of an alkylated aromatic sulfonic acid.

18. A composition of matter comprising latex and a sodium salt of a butyl naphthalene sulfonic acid.

19. The process of preserving and treating latex characterized by the employment of a soluble salt of an arylated aromatic sulfonic acid.

20. The process of preserving and treating latex characterized by the employment of a soluble salt of an arylated aromatic sulfonic acid and a liquid alcohol.

21. The process of preserving and treating latex characterized by the employment of about 2 to 6% of a soluble salt of an alkylated aromatic sulfonic acid.

22. The process of preserving and treating latex characterized by the employment of about 2 to 5% of a soluble salt of an alkylated aromatic sulfonic acid and propyl alcohol.

23. The process of preserving and treating latex characterized by the employment of about 2% of a soluble salt of a butyl naphthalene sulfonic acid.

24. Composition of matter comprising latex and a soluble salt of an arylated aromatic sulfonic acid.

25. A composition of matter comprising latex and a soluble salt of an arylated aromatic sulfonic acid in conjunction with a liquid alcohol.

26. A compositon of matter comprising latex and about 2 to 6 per cent of a soluble salt of an alkylated aromatic sulfonic acid.

27. A composition of matter comprising latex and about 2 to 5 per cent of an alkylated aromatic sulfonic acid in conjunction with propyl alcohol.

28. A composition of matter comprising latex and about 2 per cent of a soluble salt of butyl naphthalene sulfonic acid.

In testimony whereof we have hereunto set our hands.

FRITZ GÜNTHER.
HEINRICH HOPFF.
CURT SCHUSTER.